(12) United States Patent
Kobayashi

(10) Patent No.: US 11,254,280 B2
(45) Date of Patent: Feb. 22, 2022

(54) VEHICLE SIDE AIRBAG APPARATUS

(71) Applicant: Autoliv Development AB, Vargarda (SE)

(72) Inventor: Yuto Kobayashi, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 83 days.

(21) Appl. No.: 16/635,749

(22) PCT Filed: Jul. 23, 2018

(86) PCT No.: PCT/JP2018/027457
§ 371 (c)(1),
(2) Date: Jan. 31, 2020

(87) PCT Pub. No.: WO2019/026663
PCT Pub. Date: Feb. 7, 2019

(65) Prior Publication Data
US 2021/0138993 A1 May 13, 2021

(30) Foreign Application Priority Data
Aug. 2, 2017 (JP) .............................. JP2017-149999

(51) Int. Cl.
*B60R 21/233* (2006.01)
*B60R 21/207* (2006.01)
(Continued)

(52) U.S. Cl.
CPC .......... *B60R 21/233* (2013.01); *B60R 21/207* (2013.01); *B60R 21/2338* (2013.01);
(Continued)

(58) Field of Classification Search
CPC . B60R 21/233; B60R 21/2338; B60R 21/207; B60R 2021/23146; B60R 2021/23386
See application file for complete search history.

(56) References Cited

U.S. PATENT DOCUMENTS 6,270,113 B1 * 8/2001 Wipasuramonton ........................ B60R 21/23138
280/730.2
9,475,446 B2 * 10/2016 Hotta .................... B60R 21/207
(Continued)

FOREIGN PATENT DOCUMENTS

JP 2017-13746 A 1/2017
JP 2017-36038 A 2/2017
(Continued)

OTHER PUBLICATIONS

International Search Report of the International Searching Authority for PCT/JP2018/027457 dated Oct. 16, 2018.
(Continued)

*Primary Examiner* — Drew J Brown
(74) *Attorney, Agent, or Firm* — Harness, Dickey & Pierce, P.L.C.; Stephen T. Olson

(57) ABSTRACT

[Problem] To provide a vehicle side airbag apparatus which can eliminate the operation of joining baffles sectioning the inside of a side airbag into three chambers, facilitate and simplify the assembly operation thereof, easily and skillfully manufacture the side airbag, and improve productivity.
[Resolution Means] In the state in which a side airbag is folded and stored, each of first and second baffles 5, 6 is provided facing each other in the width direction of the vehicle such that two surfaces on both sides of a ridge line Q extending in the longitudinal direction of this baffle are able to at least partially overlap each other, the side airbag includes a baffle intersection which is formed by allowing the first baffle to cross the second baffle, and this baffle intersection is partially formed at a predetermined position of the ridge line of the second baffle, in addition to having a crossover opening 16 at which the first baffle penetrates through the second baffle.

13 Claims, 13 Drawing Sheets

(51) Int. Cl.
*B60R 21/2338* (2011.01)
*B60R 21/231* (2011.01)
(52) U.S. Cl.
CPC ............. *B60R 2021/23146* (2013.01); *B60R 2021/23386* (2013.01)

(56) References Cited

U.S. PATENT DOCUMENTS

| | | | |
|---|---|---|---|
| 2012/0056410 A1* | 3/2012 | Yamamoto | B60R 21/26 280/730.2 |
| 2012/0248746 A1* | 10/2012 | Yamamoto | B60R 21/23138 280/729 |
| 2014/0035264 A1* | 2/2014 | Fukushima | B60R 21/23138 280/730.2 |
| 2014/0159354 A1* | 6/2014 | Fujiwara | B60R 21/21 280/730.2 |
| 2015/0014970 A1* | 1/2015 | Fujiwara | B60R 21/233 280/730.2 |
| 2016/0159310 A1 | 6/2016 | Kobayashi et al. | |
| 2016/0159313 A1* | 6/2016 | Fujiwara | B60R 21/23138 280/729 |
| 2016/0200280 A1* | 7/2016 | Fujiwara | B60N 2/4279 280/729 |
| 2017/0008481 A1 | 1/2017 | Hotta et al. | |
| 2017/0028958 A1* | 2/2017 | Goto | B60R 21/207 |
| 2017/0036636 A1 | 2/2017 | Masuda et al. | |

FOREIGN PATENT DOCUMENTS

| | | |
|---|---|---|
| WO | 2014/098027 A1 | 6/2014 |
| WO | 2015/020052 A1 | 2/2015 |

OTHER PUBLICATIONS

English Translation of International Search Report of the International Searching Authority for PCT/JP2018/027457 dated Oct. 16, 2018.

* cited by examiner

[FIG. 1]
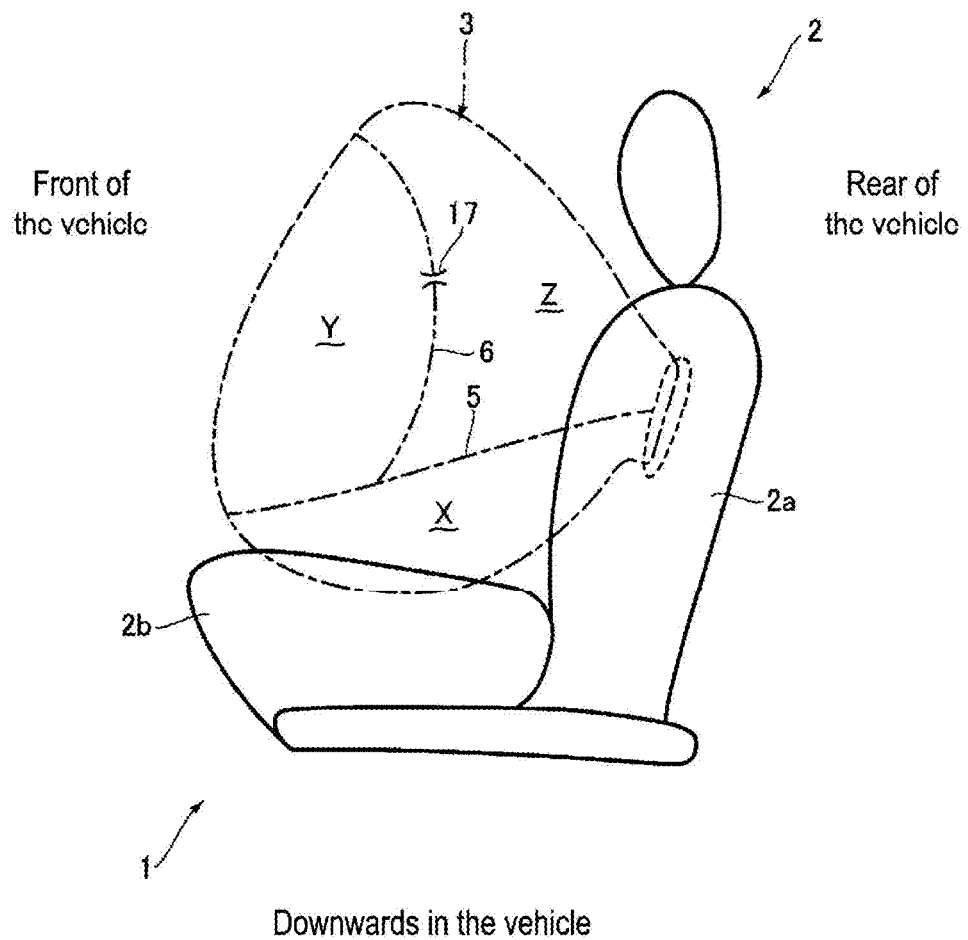

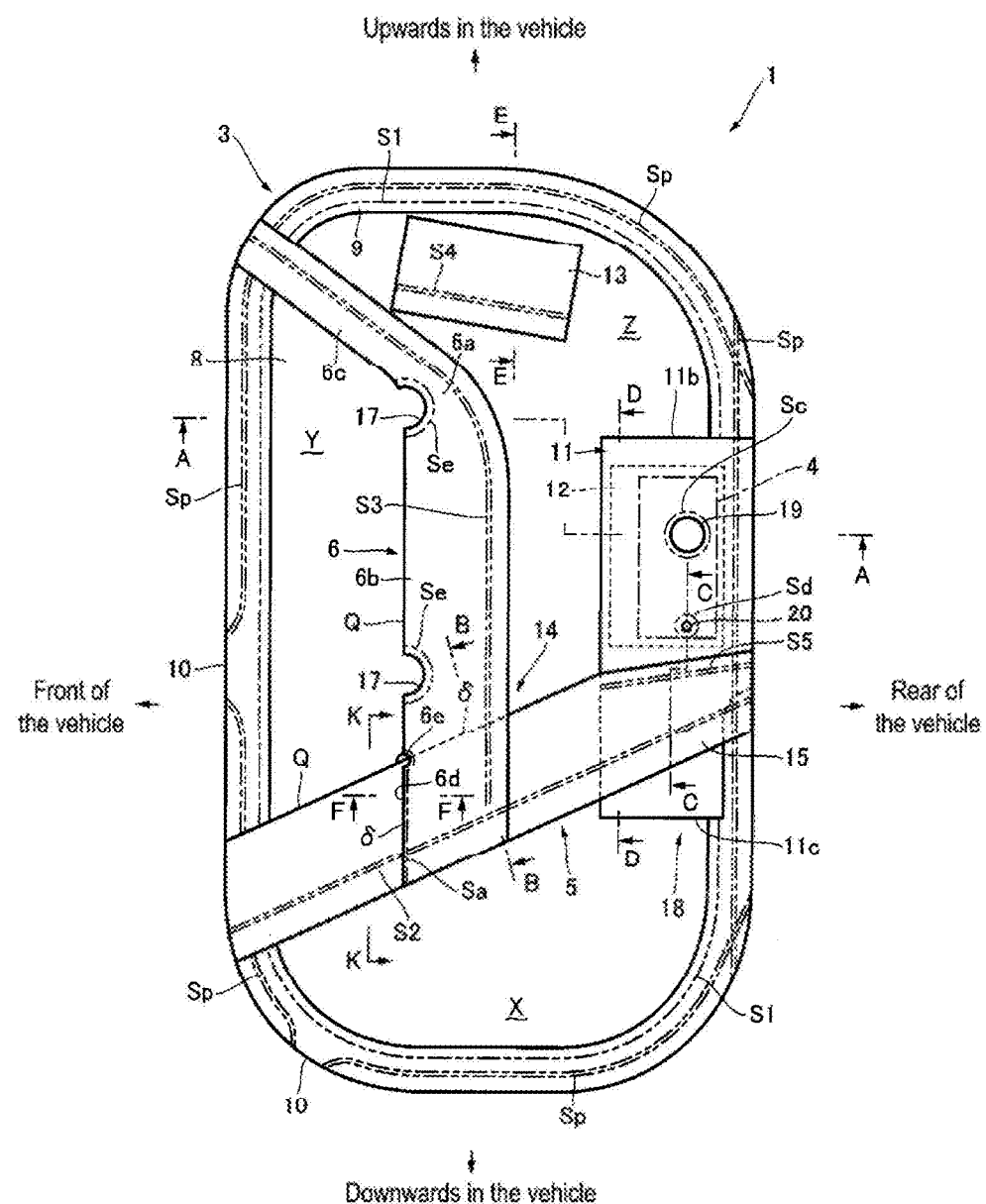
[FIG. 2]

[FIG. 3]
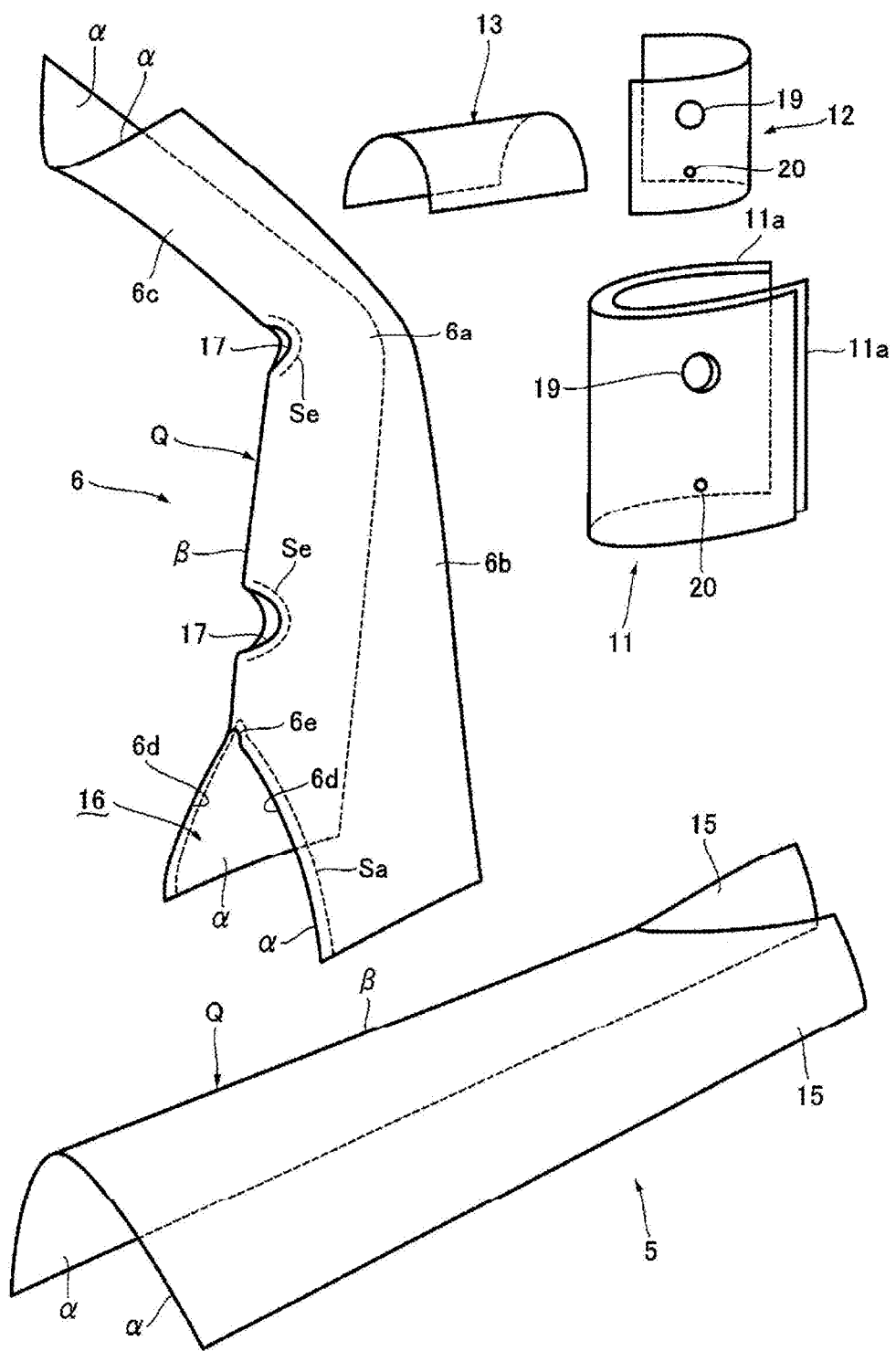

[FIG. 4]
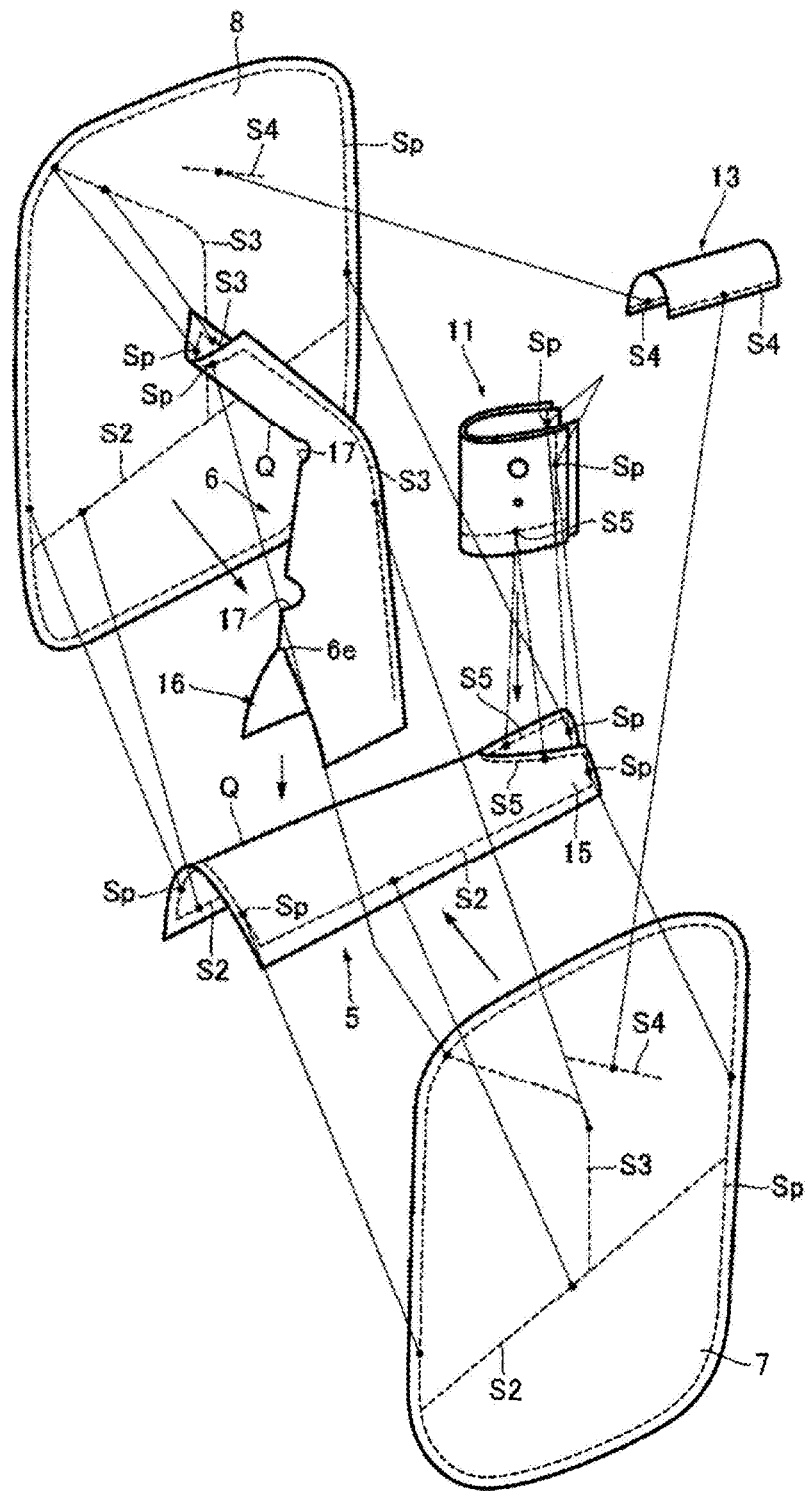

[FIG. 5]
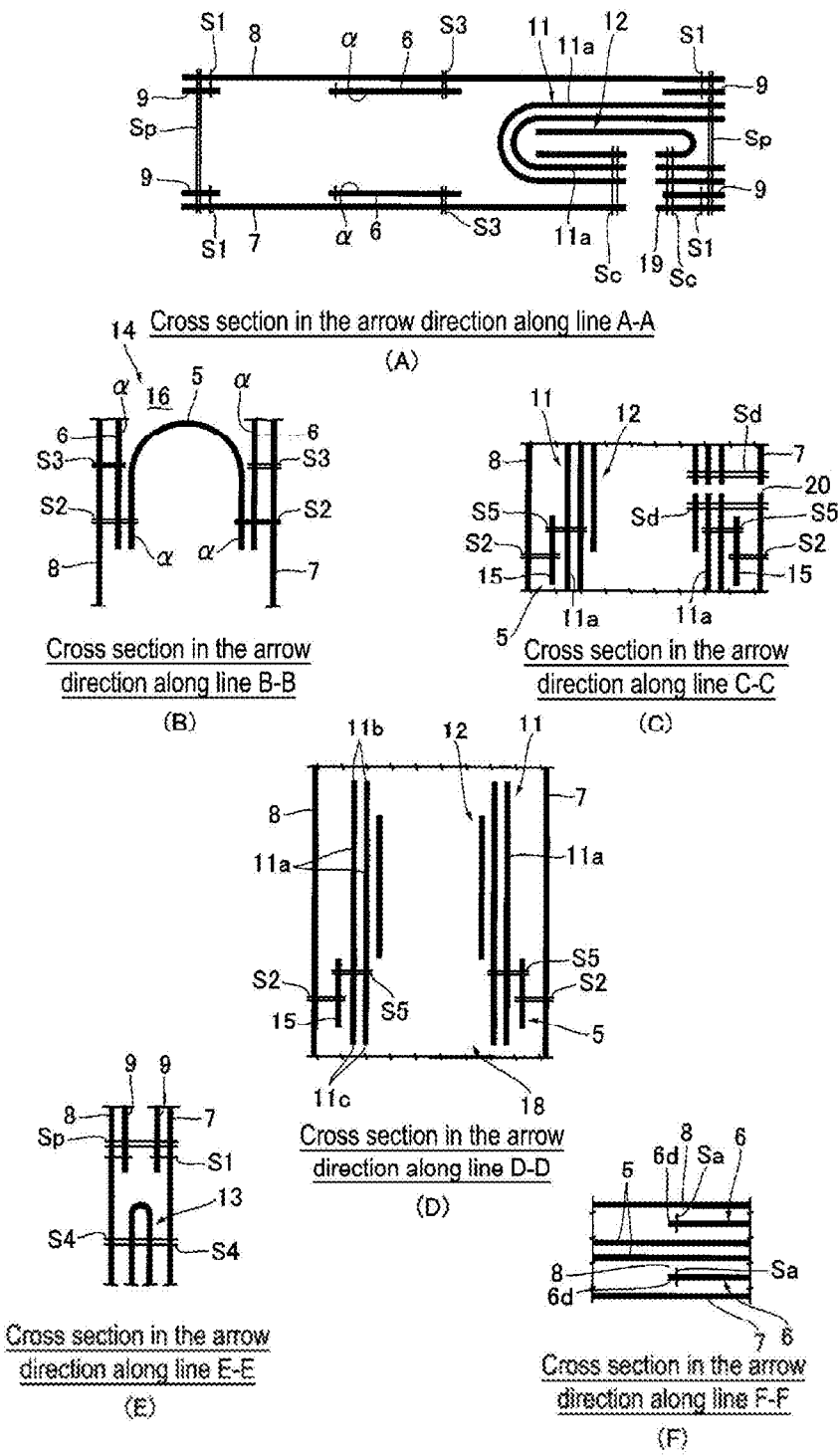

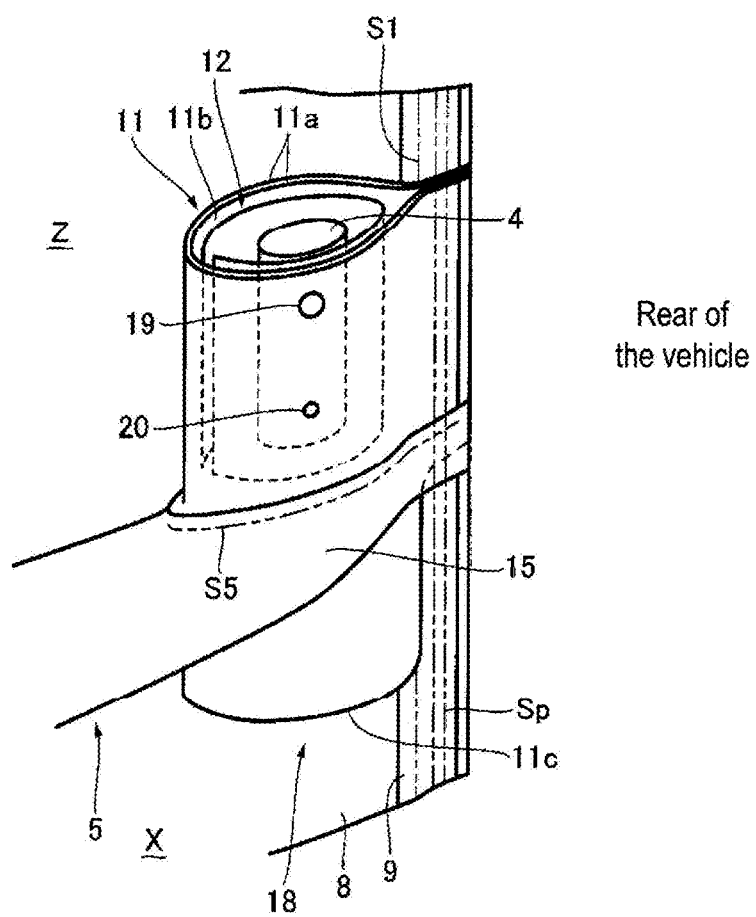
[FIG. 6]

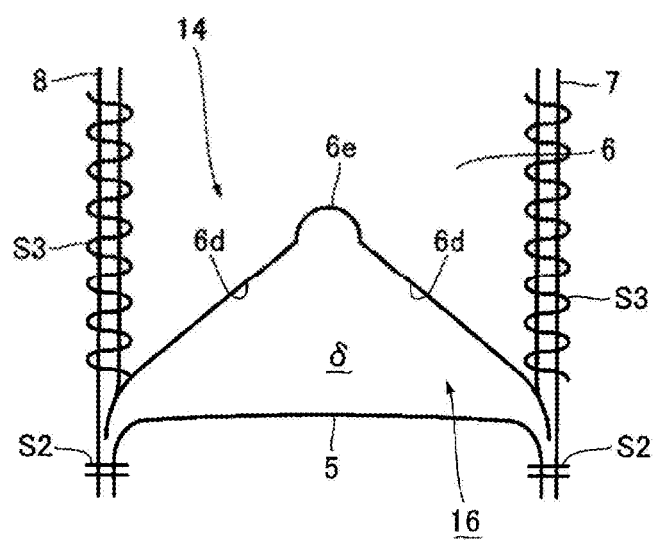
[FIG. 7]

[FIG. 8]
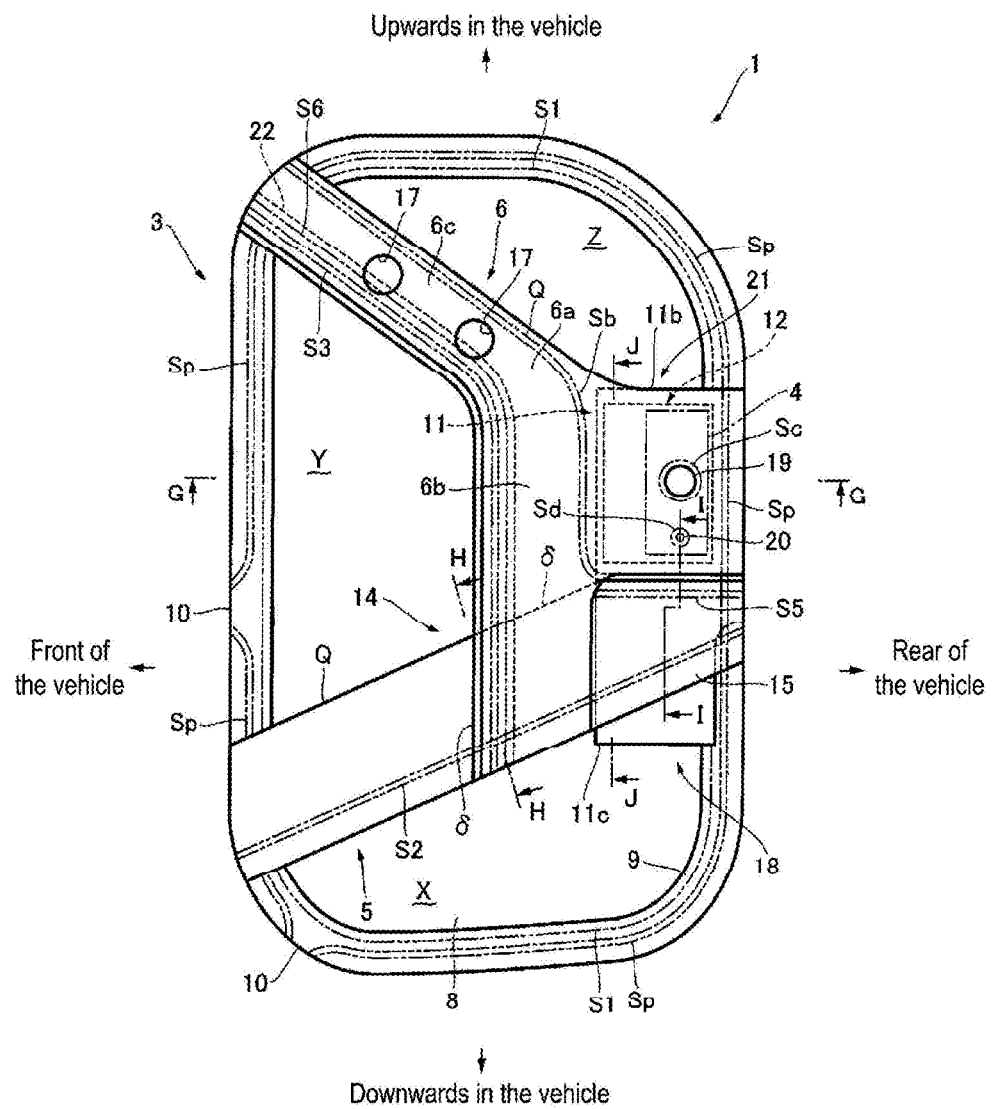

[FIG. 9]
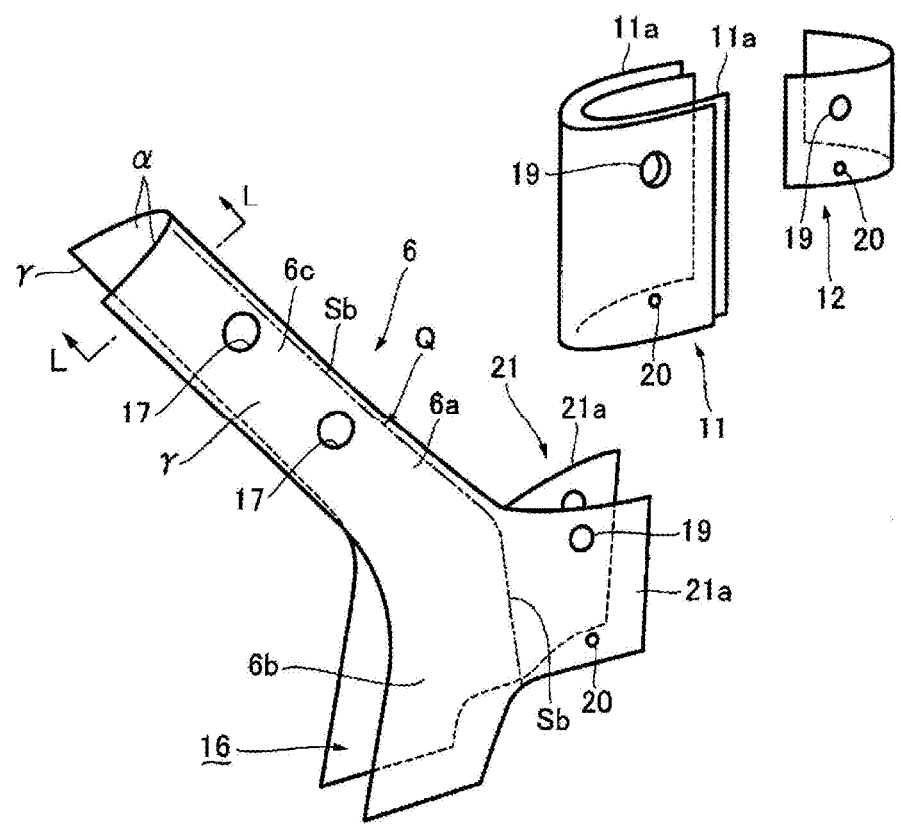

[FIG. 10]
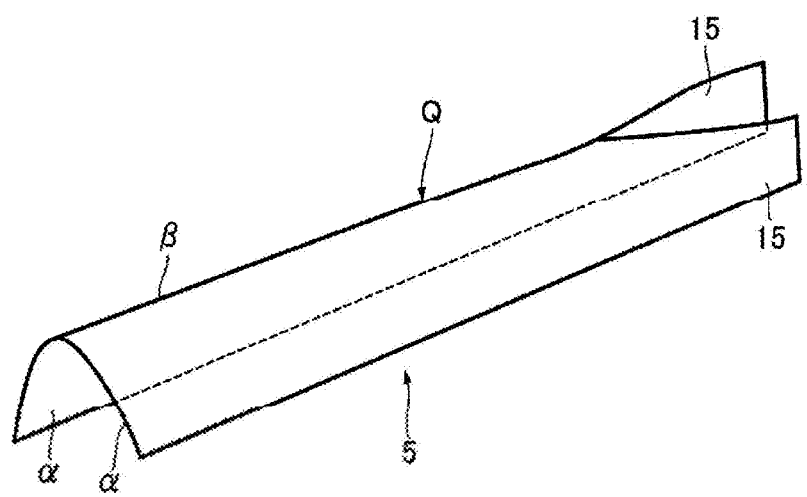
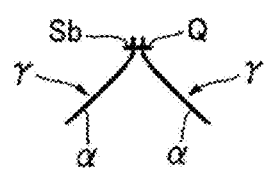

[FIG. 11]
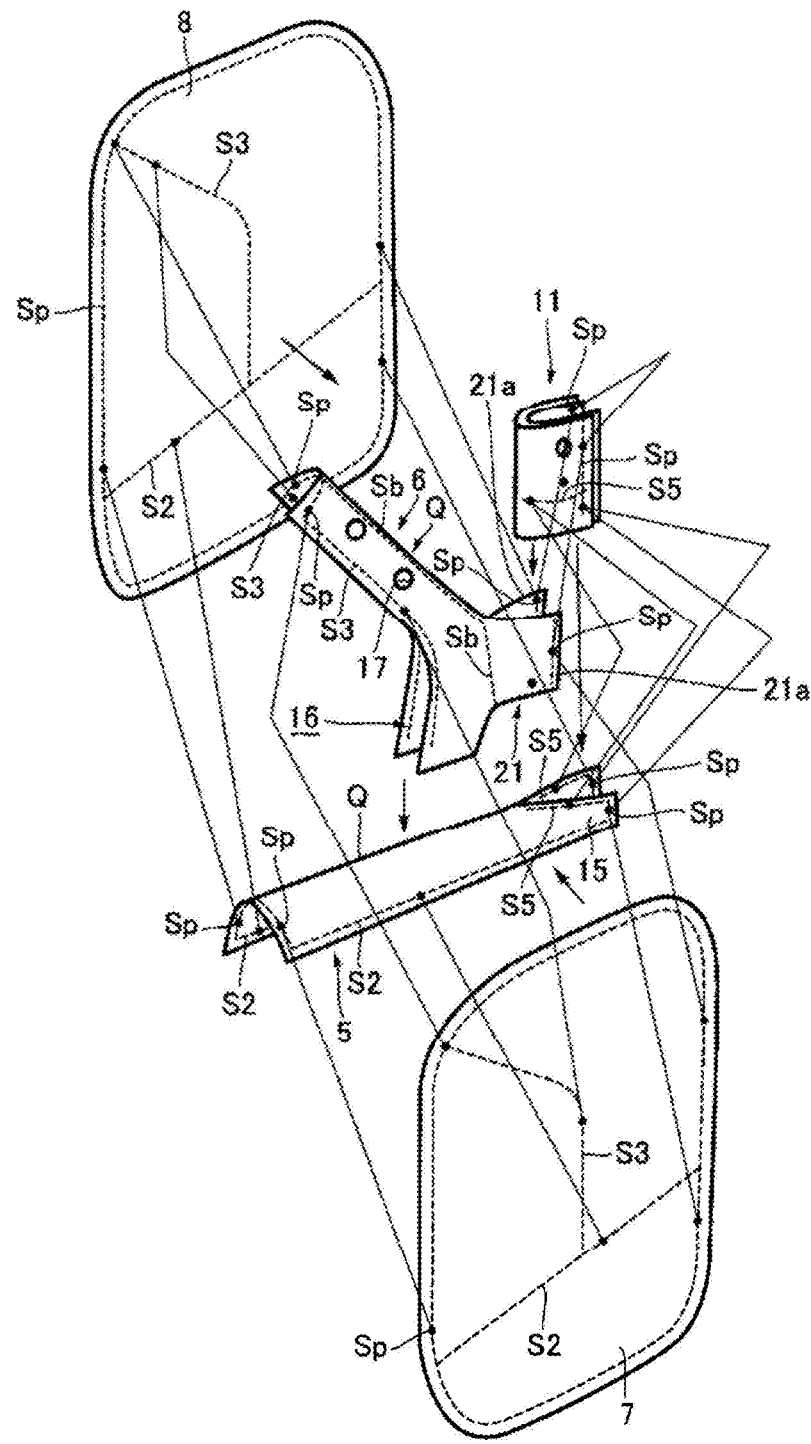

[FIG. 12]
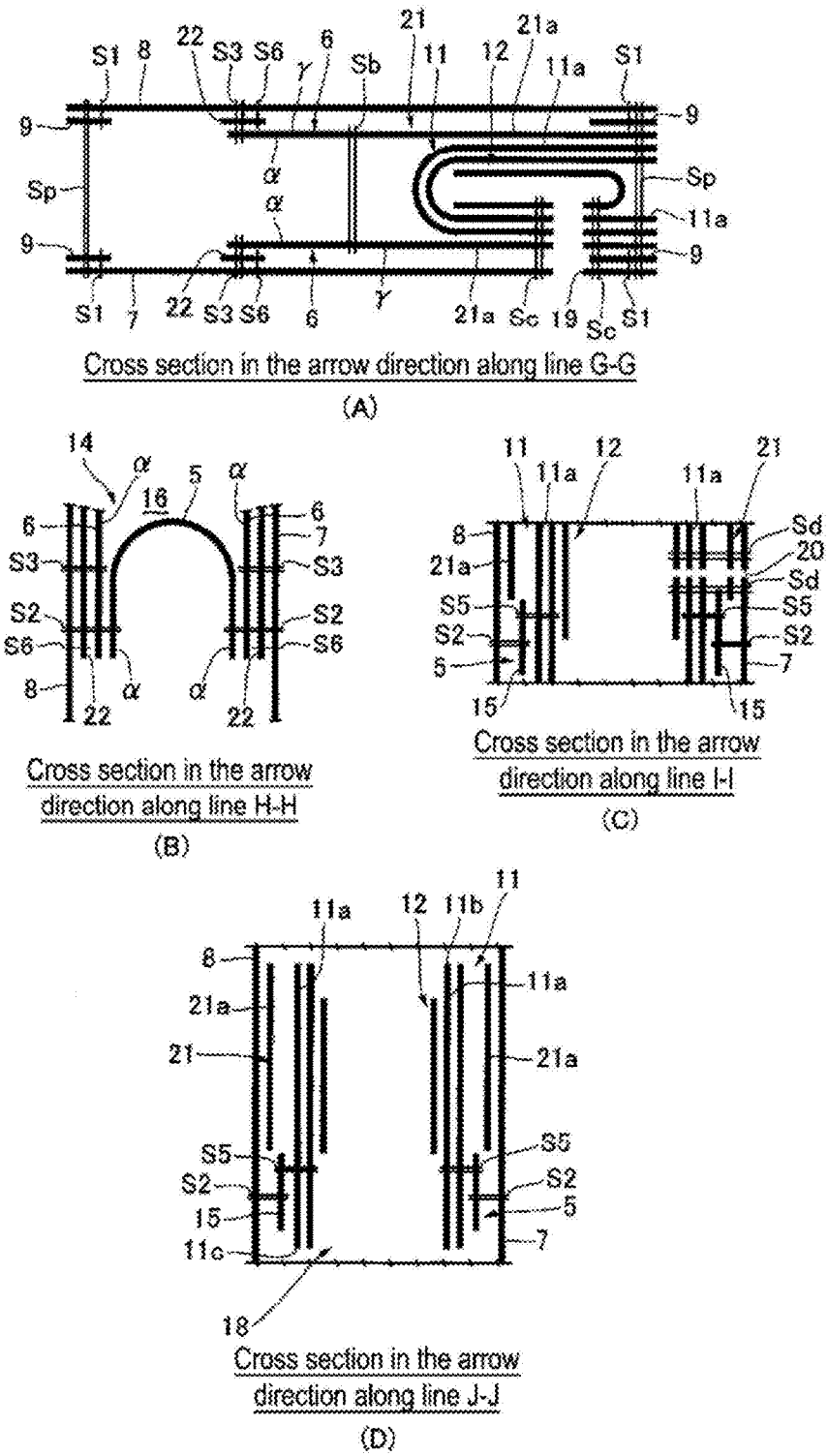

[FIG. 13]
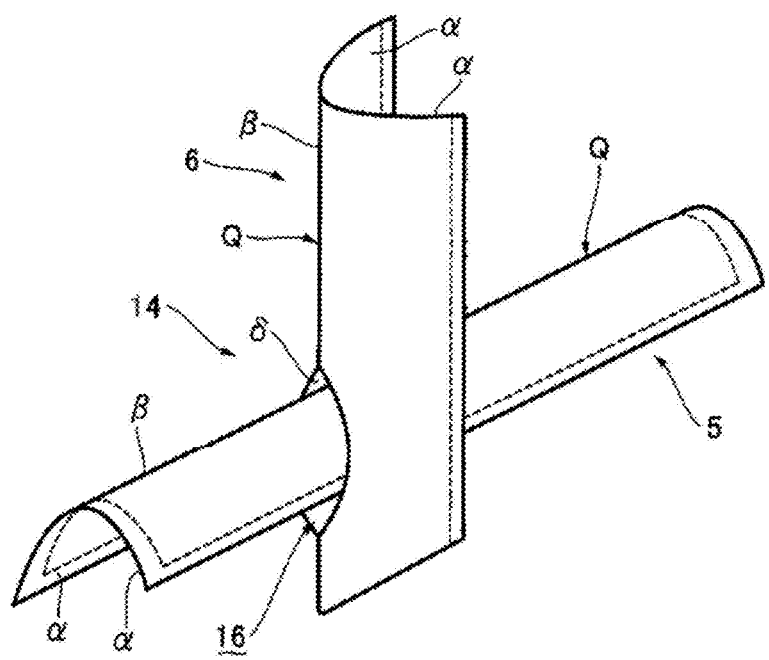

VEHICLE SIDE AIRBAG APPARATUS

TECHNICAL FIELD

The present invention relates to a vehicle side airbag apparatus which can eliminate the operation of joining baffles sectioning the inside of a side airbag into three chambers, facilitate and simplify the assembly operation thereof, easily and skillfully manufacture the side airbag, and improve productivity.

BACKGROUND

For example, Patent Document 1 describes a known vehicle side airbag apparatus, including a side airbag, wherein the inside of the side airbag which is deployed and expanded to the side of a passenger by inflator gas inside the vehicle is sectioned into three chambers by two band shaped baffles having the width of this side airbag in the thickness direction along the width direction of the vehicle when the side airbag is deployed and expanded.

In the "vehicle airbag apparatus" of Patent Document 1, the first and second baffles are band shaped, the first baffle is extended in the anteroposterior direction of a vehicle, the rear end in the length direction is joined to the rear edge of a side airbag, the second baffle is extended in the vertical direction of the vehicle, the front end in the length direction of the first baffle, together with the vehicle interior and vehicle exterior panels, is connected at overlapping baffle locations at the intermediate position in the length direction, and both ends in the length direction are joined to the outer peripheral edge of the side airbag.

RELATED ART DOCUMENTS

Patent Documents

[Patent Document 1] Republication of PCT International Publication No. 2015-020052

SUMMARY OF THE INVENTION

Problem to be Solved by the Invention

When three chambers are formed by two baffles inside a side airbag, the vehicle interior and vehicle exterior panels of the side airbag overlap the two baffles in multiple layers at overlapping baffle locations. In addition, because each chamber is formed by joining panels and baffles via individual joining lines, multiple joining lines become complicated at the overlapping locations.

For example, in the background art, at the overlapping locations, a first baffle and a second baffle overlap a vehicle exterior panel in order to carry out first joining via sewing, etc. The first baffle and the second baffle similarly overlap the vehicle interior panel in order to carry out second joining via sewing, etc. The first joining and the second joining must be carried out such that each baffle is continuously connected in the length direction.

The first joining is the operation at the depth at which the vehicle interior panel hangs over, while the second joining is the operation at the depth at which the vehicle exterior panel hangs over. In this manner, in a side airbag for forming three chambers in the structure for overlapping the two baffles, the joining operation at the overlapping locations is extremely complicated and difficult, making it hard to manufacture the side airbag easily and skillfully with high productivity.

The present invention has been created in view of the abovementioned conventional problems, with an object of providing a vehicle side airbag apparatus which can eliminate the operation of joining baffles sectioning the inside of a side airbag into three chambers, facilitate and simplify the assembly operation thereof, easily and skillfully manufacture the side airbag, and improve productivity.

Means for Solving the Problem

A vehicle side airbag device according to the present invention includes a side airbag, wherein the inside of the side airbag which is deployed and expanded to the side of a passenger by inflator gas inside the vehicle is sectioned into three chambers by two band shaped baffles for regulating the thickness of this side airbag in the thickness direction along the width direction of the vehicle when the side airbag is deployed and expanded, wherein, in the state in which the side airbag is folded and stored, each of the two baffles is provided facing each other in the width direction of the vehicle such that two surfaces on both sides of a ridge line extending in the longitudinal direction of this baffle are able to at least partially overlap each other, the side airbag includes a baffle intersection which is formed by allowing either one of the two baffles to cross the other baffle, and this baffle intersection is partially formed at a predetermined position of the ridge line of the one baffle, with a crossover opening at which this one baffle penetrates through the other baffle.

At the baffle intersection, one baffle preferably has a baffle joint which is joined to the other baffle at a position so as to avoid the ridge line of the other baffle. The ridge line of the two baffles is desirably set at a predetermined location in the thickness direction of the side airbag.

The ridge line of at least any one of the baffles is preferably a fold line which forms the two surfaces facing each other by folding back this baffle. Alternatively, the ridge line of at least any one of the baffles is desirably formed by a sewing line which joins baffle pieces configuring the two surfaces so as to face each other in order to form this baffle.

The one baffle having a crossover opening preferably has an edge forming this crossover opening, wherein this edge preferably includes an arc shaped part formed into an arc shape winding around from one of the two surfaces to the other thereof near the ridge line of the other baffle.

Desirably, the side airbag includes a vehicle exterior panel part and a vehicle interior panel part, the two baffles include a first baffle in which both edges thereof are joined to the vehicle exterior panel part and the vehicle interior panel part and provided in the anteroposterior direction of the vehicle so as to section the inside of the side airbag into a lower chamber and an upper chamber, along with a second baffle in which both edges thereof are joined to the vehicle exterior panel part and the vehicle interior panel part and extend upwards in the vertical direction of the vehicle from the vicinity of at least the intersection so as to section this upper chamber into an upper front chamber and an upper rear chamber, and the crossover opening has a gap formed between the two crossing baffles.

An inflator which is disposed in at least the upper rear chamber to eject the inflator gas is preferably provided inside the side airbag, wherein the inflator gas preferably flows from the upper rear chamber towards the upper front chamber through the gap of the crossover opening. The side airbag desirably further includes a cylindrical cover surrounding the entire inflator and including a gas outlet at the upper end part and the lower end part in order to supply the inflator gas to both the upper rear chamber and the lower chamber, wherein the vicinity of the gas outlet at the lower end part of the cylindrical cover desirably includes a check valve for regulating the backflow of the inflator gas supplied to the lower chamber.

At an intermediate part in the longitudinal direction of the second baffle, the second baffle preferably includes a bend which is bent so as to protrude from the upper front chamber side to the upper rear chamber side. A tether which is joined to the vehicle exterior panel part and the vehicle interior panel part and regulates the thickness of the side airbag when the side airbag is deployed and expanded is desirably provided in the upper rear chamber.

A communication hole which allows the upper rear chamber to communicate with the upper front chamber so as supply the inflator gas is preferably formed at the second baffle. The communication hole is desirably formed at the predetermined position of the ridge line. Alternatively, the communication hole is desirably formed at a position so as to avoid the ridge line.

Effects of the Invention

The vehicle side airbag apparatus according to the present invention can eliminate the operation of joining baffles sectioning the inside of a side airbag into three chambers, facilitate and simplify the assembly operation thereof, easily and skillfully manufacture the side airbag, and improve productivity.

BRIEF DESCRIPTION OF THE DRAWINGS

FIG. 1 is a side view schematically illustrating the vehicle side airbag apparatus described throughout the present specification.

FIG. 2 is an explanatory view illustrating one preferred embodiment of a vehicle side airbag apparatus according to the present invention, with the vehicle interior panel part of the side airbag on the right seat side omitted in order to describe the internal structure of a side airbag.

FIG. 3 is a perspective view of the main component provided inside the side airbag of the vehicle side airbag apparatus illustrated in FIG. 2.

FIG. 4 is an assembly perspective view describing the attachment of the main component illustrated in FIG. 3 to the vehicle interior panel part and the vehicle exterior panel part of the side airbag.

FIG. 5 is an explanatory view describing the cross section of each arrow part in FIG. 2.

FIG. 6 is an explanatory view describing the state of the periphery of an inflator equipped with the vehicle side airbag apparatus illustrated in FIG. 2.

FIG. 7 is a view in the arrow direction along line K-K in FIG. 2, describing the state of a crossover opening when the side airbag of the vehicle side airbag apparatus illustrated in FIG. 2 is deployed and expanded.

FIG. 8 is an explanatory view illustrating a modified example of a vehicle side airbag apparatus according to the present invention, with the vehicle interior panel part of the side airbag on the right seat side omitted in order to describe the internal structure of the side airbag.

FIG. 9 is a perspective view of the main component provided inside the side airbag of the vehicle side airbag apparatus illustrated in FIG. 8.

FIG. 10 is a cross sectional view in the arrow direction along line L-L in FIG. 9.

FIG. 11 is an assembly perspective view describing the attachment of the main component illustrated in FIG. 8 to the vehicle interior panel part and the vehicle exterior panel part of the side airbag.

FIG. 12 is an explanatory view describing the cross section of each arrow part in FIG. 8.

FIG. 13 is a perspective view illustrating the state of a baffle intersection at which a second baffle crosses a first baffle, in another modified example of the vehicle side airbag apparatus according to the present invention.

DESCRIPTION OF THE PREFERRED EMBODIMENT

Preferred embodiments of a vehicle side airbag apparatus according to the invention will hereinafter be described in detail with reference to the accompanying drawings. FIG. 1 is a side view schematically illustrating the vehicle side airbag apparatus described throughout the present specification, FIG. 2 is an explanatory view illustrating a vehicle side airbag apparatus according to the present embodiment, with the vehicle interior panel part of the side airbag on the right seat side omitted in order to describe the internal structure of a side airbag, FIG. 3 is a perspective view of the main component provided inside the side airbag of the vehicle side airbag apparatus illustrated in FIG. 2, FIG. 4 is an assembly perspective view describing the attachment of the main component illustrated in FIG. 3 to the vehicle interior panel part and the vehicle exterior panel part of the side airbag, FIG. 5 is an explanatory view describing the cross section of each arrow part in FIG. 2, FIG. 6 is an explanatory view describing the state of the periphery of an inflator equipped with the vehicle side airbag apparatus illustrated in FIG. 2, and FIG. 7 is a view in the arrow direction along line K-K in FIG. 2, describing the state of a crossover opening when the side airbag of the vehicle side airbag apparatus illustrated in FIG. 2 is deployed and expanded.

In FIG. 5, respectively, FIG. 5(A) illustrates a cross section in the arrow direction along line A-A in FIG. 2, FIG. 5(B) illustrates a cross section in the arrow direction along line B-B in FIG. 2, FIG. 5(C) illustrates a cross section in the arrow direction along line C-C in FIG. 2, FIG. 5(D) illustrates a cross section in the arrow direction along line D-D in FIG. 2, FIG. 5(E) illustrates a cross section in the arrow direction along line E-E in FIG. 2, and FIG. 5(F) illustrates a cross section in the arrow direction along line F-F in FIG. 2.

In the following description, the anteroposterior direction of the vehicle is the anteroposterior direction of the side airbag, the vertical direction of the vehicle is the vertical direction of the side airbag, and the width direction of the vehicle is the thickness direction of the side airbag as well as the width direction a baffle.

As illustrated in FIG. 1, a vehicle side airbag apparatus 1 includes a side airbag 3 embedded in a seat back 2a of a seat 2. When the side airbag 3 is folded, stored, and provided in the seat back 2a and inflator gas fills up the inside of the side airbag 3, the side airbag 3 is deployed and expanded towards the front of the vehicle from the rear of the vehicle to the side of the passenger between the passenger and the side part of the vehicle inside the vehicle.

As illustrated in FIG. 2, the vehicle side airbag apparatus 1 is configured to further include an inflator 4 which is provided inside the abovementioned side airbag 3 and eject the inflator gas into the side airbag 3.

When the side airbag 3 is deployed and expanded as illustrated in FIG. 1, the rear edge of the rear in the anteroposterior direction of the vehicle is disposed in the seat back 2a, both the upper edge and the lower edge in the vertical direction of the vehicle protrudes in the vertical direction, and the front edge of the front in the anteroposterior direction of the vehicle protrudes towards the front of the vehicle along a seat cushion 2b.

The inflator 4 is disposed inside the side airbag 3 at the rear edge in the anteroposterior direction of the vehicle and provided while fixed to the seat back 2a.

As illustrated in FIGS. 1 and 2, three chambers consisting of a lower chamber X, an upper rear chamber Z, and an upper front chamber Y are formed inside the side airbag 3. These chambers X to Z are sectioned by a first baffle 5 and a second baffle 6 mentioned below and included inside the side airbag 3.

The lower chamber X is disposed above the seat cushion 2b and formed at the lower part of the side airbag 3 (downwards in the vehicle) substantially facing the waist of the passenger. The upper rear chamber Z is disposed in front of the upper part of a seat bag 2a and formed in the rear of the side airbag 3 (upwards in the vehicle) substantially facing the shoulder of the passenger. The upper front chamber Y is disposed in front of the seat back 2a and between the lower chamber X and the upper rear chamber Z and formed in front of the side airbag 3 (upwards in the vehicle) substantially facing the chest of the passenger.

As illustrated in FIGS. 2, 4, and 5, the side airbag 3 is configured to include a vehicle interior panel part 7 and a vehicle exterior panel part 8. As is conventionally well-known in the technical field of vehicle airbags, these panel parts 7, 8 are formed into cloths of various materials which can be deployed and expanded from a storage state and are flexible and elastically deformable.

When the side airbag 3 is deployed, the vehicle exterior panel part 8 faces the side part of the vehicle such as a door inner surface and a side window inner surface. The vehicle interior panel part 7 faces the passenger when the side airbag 3 is deployed.

The side airbag 3 is formed as a bag which is expanded by the inflator gas (see FIG. 4). The side airbag 3 is formed by integrally joining the outer peripheral edges of the mutually facing panel parts 7, 8 using an outer peripheral sewing line Sp.

In the illustrated example, in order to reinforce the outer peripheral sewing line Sp and the periphery thereof, narrow band shaped reinforcing ring parts 9 (not illustrated in FIG. 4) overlap each panel part 7, 8 along the outer peripheral edges of these panel parts 7, 8. Each of these ring parts 9 is joined to each panel part 7, 8 using a first sewing line S1 (see FIGS. 2 and 5(A), (E)). The outer peripheral sewing line Sp collectively joins two ring parts 9 and each panel part 7, 8.

In the illustrated example, the vehicle interior panel part 7 serves as one panel body and the vehicle exterior panel part 8 serves as one panel body, with these two panel bodies 7, 8 joined using the outer peripheral sewing line Sp so as to form the side airbag 3. However, the example also includes a form in which a single panel body (of a size in which the vehicle interior panel part 7 and the vehicle exterior panel part 8 are continuously joined together) is folded back and joined using the outer peripheral sewing line Sp so as to form a bag shape.

The outer peripheral sewing line Sp is formed so as to be disconnected at any of the positions of the upper front chamber Y and any of the positions of the lower chamber X. As a result, a vent hole 10 for gradually discharging the inflator gas (which has filled up the inside of the side airbag 3) is formed in the side airbag 3 (see FIG. 2).

As illustrated in FIGS. 2 to 5, the first baffle 5, the second baffle 6, a cylindrical cover 11 (which is provided so as to surround the inflator 4 and function as a check valve), an inner cover 12 (which is provided inside the cylindrical cover 11 so as to surround the inflator 4), and a tether 13 are arranged in the side airbag 3.

The first baffle 5 regulates the thickness of the side airbag 3 in the thickness direction along the width direction of the vehicle of the side airbag 3 which is deployed and expanded. The first baffle 5 is formed into a band shape with the width thereof in the thickness direction of the side airbag 3. The first baffle 5 is formed into a cloth of the same material as that of the panel parts 7, 8. The width direction of the first baffle 5 is directed from the side of the passenger to the side part of the vehicle. The longitudinal direction of the first baffle 5 is directed towards the anteroposterior direction of the vehicle.

The attachment and disposition of the first baffle 5 in the side airbag 3 (each panel part 7, 8) will be described. The first baffle 5 is provided inside the side airbag 3 in the anteroposterior direction of the vehicle in order to section the abovementioned lower chamber X and the abovementioned upper chamber (upper front chamber Y and upper rear chamber Z).

Both edges of the first baffle 5 in the width direction (in the width direction of the vehicle) are joined to the panel surface of the vehicle exterior panel part 8 and the panel surface of the vehicle interior panel part 7 over the entire length thereof using a second sewing line S2 (see FIGS. 2, 4, and 5(B), (C), (D)).

The front end edge of the first baffle 5 in the longitudinal direction (in the anteroposterior direction of the vehicle) is disposed at the front end edge of the side airbag 3. The rear end edge of the first baffle 5 is disposed at the rear end edge of the side airbag 3. Using the outer peripheral sewing line Sp, the baffle 5, together with the ring parts 9, is joined to the vehicle interior panel part 7 and the vehicle exterior panel part 8 (see FIGS. 2 and 4).

The second sewing line S2 joins the first baffle 5 to the panel parts 7, 8. The second sewing line S2 ensures airtightness between the lower chamber X and the upper chamber (upper front chamber Y and upper rear chamber Z). The first baffle 5 expands the side airbag 3 in a three dimensional shape (while ensuring the thickness in the width direction of the vehicle) by widening the width direction of the vehicle between the panel parts 7, 8.

As with the first baffle 5, the second baffle 6 regulates the thickness of the side airbag 3 in the thickness direction along the width direction of the vehicle of the side airbag 3 which is deployed and expanded. The second baffle 6 is formed into a band shape with the width thereof in the thickness direction of the side airbag 3. The second baffle 6 is also formed into a cloth of the same material as that of the panel parts 7, 8. The width direction of the second baffle 6 is also directed from the side of the passenger to the side part of the vehicle. The longitudinal direction of the second baffle 6 is substantially directed towards the vertical direction of the vehicle.

The attachment and disposition of the second baffle 6 in the side airbag 3 (each panel part 7, 8) will be described. The second baffle 6 is provided inside the side airbag 3 so as to extend upwards in the vertical direction of the vehicle from the position of the first baffle 5 or the vicinity thereof. As a result, above the abovementioned lower chamber X, the second baffle 6 sections the upper front chamber Y and the upper rear chamber Z.

Regarding the second baffle 6, with a bend 6a (formed at an intermediate part in the longitudinal direction) serving as a boundary, a lower part 6b is in the vertical direction of the vehicle, while an upper part 6c extends towards the front of the vehicle. As a result, the second baffle 6 is bent so as to protrude from the upper front chamber Y side towards the upper rear chamber Z side.

In so doing, the rear part of the vehicle (mainly, the upper rear chamber Z) of the side airbag 3 can be quickly deployed, after which the front part of the vehicle of the side airbag 3 is rapidly extruded from the inside of the seat back 2a to achieve good deployment performance.

Both edges of the second baffle 6 in the width direction (in the width direction of the vehicle) are joined to the panel surface of the vehicle interior panel part 7 and the panel surface of the vehicle exterior panel part 8 over the entire length thereof using a third sewing line S3 (see FIGS. 2, 4, and 5(A), (B)).

The upper end edge of the second baffle 6 in the longitudinal direction (diagonal front in the vertical direction of the vehicle) is disposed at the upper end edge of the side airbag 3. Using the outer peripheral sewing line Sp, the second baffle 6, together with the ring parts 9, is joined to the vehicle interior panel part 7 and the vehicle exterior panel part 8 (see FIGS. 2 and 4).

The lower end part of the second baffle 6 in the longitudinal direction (vertical direction of the vehicle) is extended to the position overlapping the first baffle 5. Crossing between the lower end part of this second baffle 6 and the first baffle 5. As a result, the side airbag 3 according to the present embodiment includes the below-mentioned baffle intersection 14.

The third sewing line S3 joins the second baffle 6 to the panel parts 7, 8. The third sewing line S3 ensures airtightness between the upper front chamber Y and the upper rear chamber Z. As with the first baffle 5, the second baffle 6 expands the side airbag 3 in a three dimensional shape (while ensuring the thickness in the width direction of the vehicle) by widening the width direction of the vehicle between the panel parts 7, 8.

When the side airbag 3 deployed and expanded into a three dimensional form is folded and stored into a two dimensional form, the first and second baffles 5, 6 are also flattened.

For example, when the side airbag 3 is folded and stored, the first baffle 5 is flattened. As illustrated in FIG. 3, in the flattened first baffle 5, there are two surfaces α, a of the first baffle 5 which relate to a ridge line Q extending in the longitudinal direction and are present on both sides of this ridge line Q. These two surfaces α, a face each other in the width direction of the vehicle such that they are able to at least partially overlap each other.

Here, the ridge line is known as follows in view of Euler's formula. A three dimensional figure surrounded by planes is specified by the connective relationship between surfaces, ridge lines, and apexes, wherein the ridge lines include both protrusion ridge lines not including recess apexes and recess ridge lines not including protrusion apexes. In the present specification, the "ridge lines" include both these protrusion ridge lines and recess ridge lines.

The case in which the first baffle 5 is, for example, one cloth material will be described. When the two surfaces α that face each other are overlapped by the ridge line Q, even if the material of the first baffle 5 has flexibility and is therefore distorted (for example, wavy), the cross section of the folded and stored side airbag 3 in the anteroposterior direction of the vehicle is substantially V shaped or U shaped, etc.

A sharply folded V shaped recess line or ridge line, or a gently folded U shaped inverted region is the ridge line Q obtained by a fold line β.

The two surfaces α formed by the first baffle 5 appear on both sides of the fold line β such as a V shaped recess line. When these two surfaces α are folded at the fold line β by the ridge line Q, the first baffle 5 can be overlapped in the width direction.

The position of the ridge line Q in the first baffle 5 is set at a predetermined location in the thickness direction of the side airbag 3. The position of the ridge line Q is not limited to the center in the width direction of the first baffle 5. Therefore, when the side airbag 3 is folded and stored and the two surfaces α of the first baffle 5 overlap each other, these two surfaces α may be perfectly overlapped or partially overlapped.

Because the position of the ridge line Q is not limited to the center in the width direction of the first baffle 5, when the side airbag 3 is folded and stored, the ridge line Q may appear at any position in the width direction of the first baffle 5. Because the ridge line Q may appear at any position, the height position of the second sewing line S2 of the vehicle interior panel part 7 in the vertical direction of the vehicle may be different from the height position of the second sewing line S2 of the vehicle exterior panel part 8.

Because the width direction of the first baffle 5 is the width direction of the vehicle, the two surfaces α of the first baffle 5 face each other in the width direction of the vehicle via the ridge line Q extending in the longitudinal direction of the first baffle 5. When the side airbag 3 is folded and stored, the two surfaces α on both sides of the ridge line Q face each other in the width direction of the vehicle. The first baffle 5 can be overlapped in the width direction.

Regarding the second baffle 6 as well, the form in which the side airbag 3 is folded and stored is the same as that of the first baffle 5. The position of the ridge line Q of the second baffle 6 is also set at a predetermined location in the thickness direction of the side airbag 3. The position of the ridge line Q is not limited to the center in the width direction of the second baffle 6. Therefore, also regarding the second baffle 6, when the side airbag 3 is folded and stored, the ridge line Q may appear at any position in the width direction of the second baffle 6. Because the ridge line Q may appear at any position, the anteroposterior position of the third sewing line S3 of the vehicle interior panel part 7 in the anteroposterior direction of the vehicle may be different from the anteroposterior position of the third sewing line S3 of the vehicle exterior panel part 8.

Further, the first baffle 5 and/or the second baffle 6 may not be configured by folding back one cloth material, but, as illustrated in FIG. 10, either one or both of the first baffle 5 and the second baffle 6 may be configured by sewing at least two baffle pieces γ in the longitudinal direction of the baffles 5, 6 using a baffle sewing line Sb. The material of the baffle pieces γ is the same as that of the baffles 5, 6.

In such a configuration, the baffle sewing line Sb is the ridge line Q extending in the longitudinal direction of the first baffle 5 and the second baffle 6. Due to the ridge line Q using this baffle sewing line Sb, the two surfaces α of the baffle pieces γ are present on both sides of the ridge line Q. The two surfaces α of the baffle pieces γ face each other in the width direction of the vehicle so as to be able to be at least partially overlapped in the width direction of the baffles 5, 6.

When overlapped with the ridge line Q (baffle sewing line Sb) between the two surfaces α which face each other, the cross section of the folded and store side airbag 3 in the anteroposterior direction of the vehicle forms a substantially V shape or U shape, etc. as in the case of the fold line β.

The two surfaces α of the baffle pieces γ forming the first baffle 5 and the second baffle 6 appear on both sides of the fold line β such as a V shaped recess line. These two surfaces α can be overlapped in the width direction of the baffles 5, 6 via the ridge line Q using the baffle sewing line Sb.

Even in the case of the baffle sewing line Sb, the obtained position of the ridge line Q is also set at a predetermined location in the thickness direction of the side airbag 3. The position of the ridge line Q is not limited to the center in the width direction of the first and second baffles 5, 6. Therefore, when the side airbag 3 is folded and stored and the two surfaces α of the first baffle 5 and the second baffle 6 overlap each other, these two surfaces α may be perfectly overlapped or partially overlapped.

When the side airbag 3 is folded and stored, the two surfaces α on both sides of the ridge line Q face each other in the width direction of the vehicle such that the first baffle 5 and the second baffle 6 can be overlapped in the width direction.

In the present embodiment, when the side airbag 3 is folded and stored, the first baffle 5 forms a protrusion upwards in the vertical direction of the vehicle using the ridge line Q. The second baffle 6 forms a protrusion towards the front in the anteroposterior direction of the vehicle. However, contrarily, the first baffle 5 may form a protrusion downwards. Moreover, contrarily, the second baffle 6 may form a protrusion rearwards.

A pair of holding parts 15 facing each other in the width direction of the vehicle are formed in the first baffle 5 in order to install the inflator 4. The pair of holding parts 15 are formed at the rear end part in the rear in the anteroposterior direction of the vehicle immediately below the upper rear chamber Z such that the first baffle 5 is partially divided in the anteroposterior direction of the vehicle.

As illustrated in FIGS. 2 to 5(B), the second baffle 6 crosses the first baffle 5 so as to form a baffle intersection 14. The baffle intersection 14 is formed at the position of the lower end part of the second baffle 6 crossing the first baffle 5.

The baffle intersection 14 can be disposed by allowing the second baffle 6 to cross the first baffle 5 inside the side airbag 3. The baffle intersection 14 is configured by forming a crossover opening 16 (through which the second baffle 6 extending substantially in the vertical direction of the vehicle penetrates) in the first baffle 5 provided in the anteroposterior direction of the vehicle.

The crossover opening 16 is formed as a space such that the first baffle 5 can partially cross a predetermined position of the ridge line Q of the second baffle 6.

In the present embodiment, the crossover opening 16 is configured by partially dividing the ridge line Q (at the lower end part of the second baffle 6 extended to the position that overlaps the first baffle 5) such that the first baffle 5 can pass therethrough. With the two surfaces α of the second baffle 6 capable of being separated, the crossover opening 16 may cross the cloth first baffle 5 in a loose penetration state which produces a mutual gap δ (see FIG. 7) with the lower end part of the cloth second baffle 6.

The first baffle 5 is penetrated and disposed so as to be inserted between the two surfaces α of the second baffle 6 from the vertical direction of the vehicle in order to cross the second baffle 6.

In the present embodiment, a forked edge 6*d* is formed in the second baffle 6 by dividing the ridge line Q. An arc shaped part 6*e* winding around from one of the two surfaces α of the second baffle 6 to the other thereof near the ridge line Q of the first baffle 5 is formed at this edge 6*d* partitioning the crossover opening 16. This arc shaped part 6*e* can ease the stress concentration of the forked edge 6*d* and the periphery thereof.

A reinforcing sewing line Sa is provided along this edge 6*d* (see FIGS. 2, 3, and 5(F)). Using the reinforcing sewing line Sa, the strength of the edge 6*d* and the periphery thereof can be enhanced.

The first baffle 5 and the second baffle 6 are joined to the vehicle interior panel part 7 and the vehicle exterior panel part 8 using the second and third sewing lines S2, S3 and attached and fixed to the side airbag 3. Therefore, at the baffle intersection 14, the first baffle 5 and the second baffle 6 need only be simply crossed, with no need to be joined by sewing, etc.

At the baffle intersection 14 according to the present embodiment, at a position avoiding the ridge line Q of the first baffle 5 using the second sewing line S2, the lower end part of the second baffle 6 is joined to the first baffle 5 to the extent of slight temporary fastening (see FIG. 5(B)). This slight temporary fastening enables the form of the baffle intersection 14 to be appropriately maintained when the side airbag 3 is folded and stored. This temporary fastening is not essential.

While the first baffle 5 is not joined to the second baffle 6, only penetration and insertion into the crossover opening 16 of the baffle intersection 14 is carried out. In this configuration, as illustrated in FIG. 2, the gap δ allowing an upper front chamber Y to communicate with the upper rear chamber Z is formed above the first baffle 5 crossing the second baffle 6.

When the side airbag 3 is deployed and expanded by inflator gas, as illustrated in FIG. 7, the first baffle 5 and the second baffle 6 widen in the thickness direction of the side airbag 3 (in the width direction of the vehicle). As a result, this gap δ in the crossover opening 16 widens, allowing the inflator gas which passes through this gap δ to flow from the upper rear chamber Z towards the upper front chamber Y.

As illustrated in FIGS. 2 to 4, the upper rear chamber Z and the upper front chamber Y are communicated with the second baffle 6 according to the present embodiment with the ridge line Q serving as the fold line β so as to form a communication hole 17 through which the inflator gas flows (see FIG. 1, etc.). The communication hole 17 is disposed at the predetermined position of the ridge line Q in the vicinity of a bend 6*a* and in the vicinity of the first baffle 5. The communication hole 17 is reinforced by a reinforcing sewing line Se. The position of the communication hole 17 is not limited to the position of the ridge line Q, but may be any position of the second baffle 6.

A tether 13 for adjusting the thickness in the upper rear chamber Z of the deployed and expanded side airbag 3 is provided in the upper rear chamber Z of the side airbag 3. The tether 13 couples the vehicle interior panel part 7 and the vehicle exterior panel part 8 in the thickness direction of the side airbag 3. That is, the tether 13 regulates the thickness of the side airbag 3 when the side airbag 3 is deployed and expanded.

The tether 13 is formed from a thick band shaped cloth material. Both ends in the width direction of the tether 13 are sewn to both the vehicle interior panel part 7 and the vehicle exterior panel part 8 using a fourth sewing line S4 (see FIGS. 2, 4, and 5(E)). The tether 13 can properly set the expansion form of the upper rear chamber Z of the side airbag 3.

The side airbag 3 further has a cylindrical cover 11. The inflator 4 provided inside the side airbag 3 is provided in the cylindrical cover 11 such that the entirety thereof is surrounded by the cylindrical cover 11. The cylindrical cover 11 is formed into a hollow cylindrical shape longitudinally in the vertical direction of the vehicle. The cylindrical cover 11 is configured by overlapping two cover pieces 11a. The cylindrical cover 11 is formed by folding back these two overlapped cover pieces 11a in a U shape in a plane. The cover pieces 11a are formed in a sheet shape from a heat resistant synthetic resin material having higher rigidity than that of the panel parts 7, 8, etc.

The cover pieces 11a of the cylindrical cover 11 are disposed between the pair of holding parts 15 of the first baffle 5. In addition, the cover pieces 11a of the cylindrical cover 11 are joined to each holding part 15 along the folded back direction thereof using a fifth sewing line S5 (see FIGS. 2, 4, and 5(C), (D)), such that the cylindrical cover 11 is provided from the upper rear chamber Z to a lower chamber X.

The rear ends of four overlapped cover pieces 11a in the anteroposterior direction of the vehicle, together with the first baffle 5 (holding part 15) and ring parts 9, are joined to the vehicle interior panel part 7 and the vehicle exterior panel part 8 using an outer peripheral sewing line Sp (see FIGS. 2, 4, and 5(A)). This joining allows the cover pieces 11a to be formed in the cylindrical cover 11.

The cylindrical cover 11 is formed by opening the upper end and the lower end such that the upper end part and the lower end part include gas outlets 11b, 11c. As illustrated in FIG. 2, most portions of the cylindrical cover 11 are disposed in the upper rear chamber Z. The gas outlet 11b at the upper end part of the cylindrical cover 11 is communicated with the inside of the upper rear chamber Z. The lower part of the cylindrical cover 11 protrudes below the holding parts 15 of the first baffle 5 in the vertical direction of the vehicle towards the inside of the lower chamber X. The gas outlet 11c at the lower end part of the cylindrical cover 11 is communicated with the inside of the lower chamber X.

An inner cover 12 is provided in the cylindrical cover 11. The inner cover 12 is formed at a length shorter than the length of the cylindrical cover 11 in the vertical direction of the vehicle. The inner cover 12 is folded back in a U shape so as to form a substantially cylindrical shape and is embedded in the cylindrical cover 11. The inner cover 12 is formed into a sheet shape from the same material as the panel parts 7, 8, etc.

The inner cover 12 is provided so as to be disposed in the cylindrical cover 11 above the holding parts 15 of the first baffle 5. The cylinder shaped inflator 4 ejecting the inflator gas is provided in the cylindrical cover 11. The inflator 4 is surrounded by the inner cover 12 and disposed in the upper rear chamber Z.

The inflator 4 supplies the inflator gas to both the upper rear chamber Z and the lower chamber X via the gas outlets 11b, 11c of the cylindrical cover 11. The inflator 4 is provided such that the entirety from the upper end part to the lower end part is surrounded by the cylindrical cover 11 and the inner cover 12. The inflator gas is ejected from both the gas outlets 11b, 11c at the upper end part and the lower end part of the cylindrical cover 11 towards the lower chamber X and the upper rear chamber Z.

At the lower part of the cylindrical cover 11, the vicinity of the gas outlet 11c at the lower end part of the cylindrical cover 11 includes a check valve 18. The cylindrical cover 11 maintains a hollow cylindrical shape in the upper rear chamber Z. The cylindrical cover 11 functions as the check valve 18 in which the lower part disposed in the lower chamber X can be blocked by the action of the gas pressure.

The inflator gas ejected from the gas outlet 11c at the lower end part of the cylindrical cover 11 increases the pressure in the lower chamber X. In the check valve 18, when the pressure in the lower chamber X is greater than the pressure inside the lower part of the cylindrical cover 11, the lower part of the cylindrical cover 11 is crushed and deformed so as to block the gas outlet 11c. As a result, the check valve 18 can regulate the inflator gas in the lower chamber X from flowing back into the cylindrical cover 11.

Note that in the figure, regarding two holes 19, 20 which are penetrated and formed from the inner cover 12 towards the vehicle interior panel part 7, the larger hole 19 is provided to insert an attaching bolt for fixing the inflator 4 to a seat back 2a, while the smaller hole 20 is provided for harness insertion in order to activate the inflator 4. Each of these holes 19, 20 is reinforced by reinforcing sewing lines Sc, Sd.

The mode of operation of the vehicle side airbag apparatus 1 according to the abovementioned embodiments will hereinafter be described with reference to the accompanying drawings. First, a method for manufacturing the vehicle side airbag apparatus 1 will be described. (i) The vehicle interior panel part 7 and the vehicle exterior panel part 8 to which the ring parts 9 are attached using a first sewing line S1, (ii) the first baffle 5 in which the holding parts 15 are formed, (iii) the second baffle 6 in which the communication hole 17 and the edge 6d are reinforced by the sewing lines Sa, Se, (iv) the cover pieces 11a in which the holes 19, 20 are formed so as to form the cylindrical cover 11, (v) the inner cover 12 in which the holes 19, 20 are formed, and (vi) the tether 13 are created and prepared.

Next, using the third sewing line S3, both edges in the width direction of the second baffle 6 are joined to both the vehicle interior and vehicle exterior panel parts 7, 8, with the tether 13 joined using the fourth sewing line S4. Moreover, using a fifth sewing line S5, the folded back cover pieces 11a are joined to each holding part 15 of the first baffle 5.

Next, the interval between the vehicle interior and vehicle exterior panel parts 7, 8, which can be separated from each other, is widened, the first baffle 5 to which the cover pieces 11a are joined is inserted between these panel parts 7, 8, and the first baffle 5 is inserted into the crossover opening 16 of the second baffle 6. Next, using the second sewing line S2, both edges in the width direction of the first baffle 5 are joined to both the vehicle interior and vehicle exterior panel parts 7, 8.

Subsequently, the folded back inner cover 12 is inserted between the folded back cover pieces 11a. Next, using the sewing lines Sc, Sd formed around the holes 19, 20, the cylindrical cover 11, the inner cover 12, the ring parts 9, and the vehicle interior panel part 7 are joined. The inflator 4 is inserted into the inner cover 12, with an attaching bolt of this inflator 4 protruding from the hole 19.

Subsequently, joining is carried out using the outer peripheral sewing line Sp. Next, the vehicle interior and vehicle exterior panel parts 7, 8 (including the ring parts 9), the holding parts 15, and the cylindrical cover 11 are collectively joined at the rear end in the anteroposterior direction of the vehicle. In other outer peripheral edge parts, the upper end part of the second baffle 6 and the front end part of the first baffle 5, together with the ring parts 9, are joined to the vehicle interior and vehicle exterior panel parts 7, 8. Thereby, manufacturing of the vehicle side airbag apparatus 1 is completed.

When the inflator 4 of the vehicle side airbag apparatus 1 is operated, the inflator gas is introduced into the side airbag 3 via the cylindrical cover 11. The inflator gas introduced into the upper rear chamber Z deploys and expands this upper rear chamber Z. The inflator gas further passes from the upper rear chamber Z through the communication hole 17 and the gap δ between the first baffle 5 and the second baffle 6 of the crossover opening 16, then flows into the upper front chamber Y. In addition, the inflator gas deploys and expands the upper front chamber Y. Moreover, the inflator gas introduced into the lower chamber X deploys and expands this lower chamber X. Thereby, the side airbag 3 exerts a passenger protection function.

In the vehicle side airbag apparatus 1 according to the present embodiment, regarding the attachment and installation of the first baffle 5 and the second baffle 6 which form three chambers X to Z in the side airbag 3, each of the first and second baffles 5, 6 is provided facing each other in the width direction of the vehicle such that two surfaces α on both sides of a ridge line Q towards the longitudinal direction of the baffle are able to partially overlap each other in the width direction of these baffles 5, 6, the vehicle side airbag apparatus 1 has the baffle intersection 14 at which the second baffle 6 crosses the first baffle 5, and the baffle intersection 14 is partially formed at the lower end part of the ridge line Q of the second baffle 6, and has the crossover opening 16 at which the first baffle 5 penetrates through this second baffle 6 in the crossing direction therebetween. Therefore, the crossover opening 16 of the baffle intersection 14 can eliminate the joining operation between the first baffle 5 and the second baffle 6. Three chambers can be formed only by an easy and simple assembly operation involving individually joining the first baffle 5 and the second baffle 6 to the vehicle interior and vehicle exterior panel parts 7, 8. Thereby, the side airbag 3 can be easily and skillfully manufactured, making it possible to improve the productivity of the vehicle side airbag apparatus 1.

At the crossover opening 16, the gap δ is formed between the crossing first and second baffles 5, 6. Consequently, the inflator gas can be supplied from the upper rear chamber Z to the upper front chamber Y via this gap δ, making it possible to improve the deployment and expansion performance of the side airbag 3.

FIGS. 8 to 12 illustrate modified examples of the vehicle side airbag apparatus according to the present invention. FIG. 8 is an explanatory view illustrating a modified example of a vehicle side airbag apparatus according to the present invention, with the vehicle interior panel part of the side airbag on the right seat side omitted in order to describe the internal structure of the side airbag, FIG. 9 is a perspective view of the main component provided inside the side airbag of the vehicle side airbag apparatus illustrated in FIG. 8, FIG. 10 is a cross sectional view in the arrow direction along L-L in FIG. 9, FIG. 11 is an assembly perspective view describing the attachment of the main component illustrated in FIG. 8 to the vehicle interior panel part and the vehicle exterior panel part of the side airbag, and FIG. 12 is an explanatory view describing the cross section of each arrow part in FIG. 8.

In FIG. 11, respectively, FIG. 11(A) illustrates a cross section in the arrow direction along line G-G in FIG. 8, FIG. 11(B) illustrates a cross section in the arrow direction along line H-H in FIG. 8, FIG. 11(C) illustrates a cross section in the arrow direction along line I-I in FIG. 8, and FIG. 11(D) illustrates a cross section in the arrow direction along line J-J in FIG. 8.

In this modified example, the configuration of a second baffle 6 is different from that of the abovementioned embodiment. Moreover, the installation of a tether 13 is omitted.

As illustrated in FIGS. 8 to 12, the second baffle 6 is configured by integrally forming a surrounding part 21 of a cylindrical cover 11 in the second baffle 6 described in the abovementioned embodiment.

The second baffle 6 is formed by overlapping two baffle pieces γ and joining them using a baffle sewing line Sb. The surrounding part 21 is formed such that a pair of protruding pieces 21a (which protrude rearwards in the anteroposterior direction of the vehicle from each of the two baffle pieces γ) are partitioned from the second baffle 6 by the baffle sewing line Sb. The pair of protruding pieces 21a are provided in a side airbag 3 so as to be disposed above holding parts 15 of first baffle 5 and face each other in the width direction of the vehicle.

As illustrated in FIG. 8, the baffle sewing line Sb reaches the vicinity of the upper end of the protruding pieces 21a from the upper end part of the second baffle 6 and is formed therefrom downwards to the lower end of the protruding pieces 21a. As illustrated in FIG. 10, the second baffle 6 is formed by joining the two baffle pieces γ for forming two surfaces α facing each other using the baffle sewing line Sb. The baffle sewing line Sb serves as a ridge line Q.

Using the baffle sewing line Sb and an outer peripheral sewing line Sp, the pair of protruding pieces 21a form the surrounding part 21 surrounding the cylindrical cover 11 above the holding parts 15 (see FIGS. 8, 11, and 12(A)). The surrounding part 21 formed by the pair of protruding pieces 21a protrudes rearwards from the second baffle 6 in the anteroposterior direction of the vehicle from the position above the first baffle 5 at the height in which the abovementioned inner cover 12 is stored therein (see FIG. 12(D)).

The second baffle 6 is different from that of the abovementioned embodiment. When a side airbag 3 is folded and stored, the second baffle 6 is provided so as to form a protrusion rearwards in the anteroposterior direction of the vehicle, using the ridge line Q by the baffle sewing line Sb.

A crossover opening 16 of a baffle intersection 14 is formed between the lower end of the protruding pieces 21a (serving as the terminal of the baffle sewing line Sb on the lower side in the vertical direction of the vehicle) and the lower end part of the second baffle 6. Regarding the entire length of the second baffle 6 from the upper end part thereof to the lower end part thereof, the two surfaces α (two baffle pieces γ) on both sides of the ridge line Q (baffle sewing line Sb) towards the longitudinal direction are provided facing each other in the width direction of the vehicle so as to at least partially overlap each other in the width direction.

In this modified example, the crossover opening 16 is partially formed at the lower end part of the ridge line Q by stopping the baffle sewing line Sb (serving as the ridge line Q) at the lower end of the protruding pieces 21a, in addition to setting, to non-joining, the region from the lower end of the protruding pieces 21a to the lower end part of the second baffle 6.

In other words, in the mode of partially removing the ridge line Q which may reach the lower end part of the second baffle 6 such that the first baffle 5 can pass therethrough, the two surfaces α of the second baffle 6 can be separated from each other. As a result, the crossover opening 16 may cross the cloth first baffle 5 in a loose penetration state which produces a mutual gap δ with the lower end part of the cloth second baffle 6 (see the abovementioned embodiment FIG. 7).

As in the abovementioned embodiment, the first baffle 5 is disposed so as to be inserted between the two surfaces α of the second baffle 6 from the vertical direction of the vehicle in order to cross the second baffle 6.

While the first baffle 5 is not joined to the second baffle 6, penetration and insertion into the crossover opening 16 is carried out. Therefore, as in the abovementioned embodiment, the gap δ allowing an upper front chamber Y to communicate with an upper rear chamber Z is formed between the first baffle 5 and the second baffle 6 which are crossed. Inflator gas passes through this gap δ and flows from the upper rear chamber Z towards the upper front chamber Y.

In the second baffle 6, a communication hole 17 is formed at each of the two surfaces α (two baffle pieces γ) at a position that avoids the ridge line Q. The communication hole 17 allows the upper rear chamber Z to communicate with the upper front chamber Y.

In this modified example, in a vehicle interior panel part 7 and a vehicle exterior panel part 8, along a third sewing line S3 for joining the second baffle 6 to the panel surfaces thereof, thin band shaped reinforcing belt parts 22 (not illustrated in FIG. 11) for enhancing the joining strength on the periphery of this third sewing line S3 are joined and provided using a sixth sewing line S6. In addition, the second baffle 6, together with the belt parts 22, is joined to the vehicle interior panel part 7 and the vehicle exterior panel part 8 (see FIGS. 8 and 12(A), (B)).

As illustrated in FIGS. 8 and 12(C), the cylindrical cover 11 is held by the holding parts 15 of the first baffle 5 as in the abovementioned embodiment. The cylindrical cover 11 is also held by the surrounding part 21 in the upper rear chamber Z above the holding parts 15.

Regarding the surrounding part 21 integrally formed in the second baffle 6, cover pieces 11a of the cylindrical cover 11 and the inner cover 12 are disposed between the pair of protruding pieces 21a forming this surrounding part 21. The pair of protruding pieces 21a, together with ring parts 9 and the rear end of the cover pieces 11a in the anteroposterior direction of the vehicle, are joined to the vehicle interior panel part 7 and the vehicle exterior panel part 8 using the outer peripheral sewing line Sp (see FIG. 12(A)).

This joining allows the surrounding part 21 to be formed by the pair of protruding pieces 21a, in addition to also allowing the cylindrical cover 11 to be formed by the cover pieces 11a. The surrounding part 21 can strongly fix the cylindrical cover 11 to the side airbag 3, allowing the inflator gas to appropriately flow in the upper rear chamber Z. The other configurations thereof are the same as those of the abovementioned embodiment.

A method for manufacturing the vehicle side airbag apparatus 1 according to a modified example will be described. (i) The vehicle interior panel part 7 and the vehicle exterior panel part 8 to which the ring parts 9 are attached using a first sewing line S1 and the belt parts 22 are attached using the sixth sewing line S6, (ii) the first baffle 5 in which the holding parts 15 is formed, (iii) the second baffle 6 which is formed by joining the two baffle pieces γ using the baffle sewing line Sb, has the pair of protruding pieces 21a partitioning the baffle sewing line Sb, and in which the communication hole 17 and holes 19, 20 are further formed, (iv) the cover pieces 11a in which the holes 19, 20 are formed so as to form the cylindrical cover 11, and (v) the inner cover 12 in which the holes 19, 20 are formed are created and prepared.

Next, using the third sewing line S3, both edges in the width direction of the second baffle 6 are joined to both the vehicle interior and vehicle exterior panel parts 7, 8. Moreover, using a fifth sewing line S5, the cover pieces 11a are folded back and joined to each holding part 15 of the first baffle 5.

Next, the interval between the vehicle interior and vehicle exterior panel parts 7, 8, which can be separated from each other, is widened, the first baffle 5 to which the cover pieces 11a are joined is inserted between these panel parts 7, 8, and the first baffle 5 is inserted into the crossover opening 16 of the second baffle 6. At this time, the cover pieces 11a are inserted between the pair of protruding pieces 21a of the second baffle 6.

Next, using the third sewing line S3, both edges in the width direction of the first baffle 5 are joined to both the vehicle interior and vehicle exterior panel parts 7, 8. Subsequently, the folded back inner cover 12 is inserted between the folded back cover pieces 11a.

Next, using the sewing lines Sc, Sd formed around the holes 19, 20, the surrounding part 21, the cylindrical cover 11, the inner cover 12, the ring parts 9, and the vehicle interior and vehicle exterior panels 7, 8 are joined. Subsequently, the inflator 4 is inserted into the inner cover 12, with an attaching bolt of this inflator 4 protruding from the hole 19.

Next, using the outer peripheral sewing line Sp, the vehicle interior and vehicle exterior panel parts 7, 8 (including the ring parts 9), the surrounding part 21, and the cylindrical cover 11 are collectively joined at the rear end in the anteroposterior direction of the vehicle. Moreover, the vehicle interior and vehicle exterior panel parts 7, 8 (including the ring parts 9), the holding parts 15, and the cylindrical cover 11 are collectively joined below the surrounding part 21. In other outer peripheral edge parts, using the outer peripheral sewing line Sp, the upper end part of the second baffle 6 and the front end part of the first baffle 5, together with the ring parts 9, are joined to the vehicle interior and vehicle exterior panel parts 7, 8. As a result, manufacturing of the vehicle side airbag apparatus 1 according to the modified example is completed.

The deployment and expansion action of the side airbag 3 by the operation of the inflator 4 is the same as the abovementioned embodiment. Needless to say, in such modification examples as well, the same effects as those of the abovementioned embodiments are achieved.

FIG. 13 illustrates another modified example according to the abovementioned embodiment. FIG. 13 is a perspective view illustrating the state of a baffle intersection at which a second baffle crosses a first baffle. As illustrated, a crossover opening 16 of a baffle intersection 14 is not limited to the abovementioned form of partially dividing a second baffle 6, as long as the first baffle 5 can be crossed in the direction of penetrating through the second baffle 6. Needless to say, the crossover opening 16 may be in the form of a through hole which is partially formed at the position of a ridge line Q.

The joining method in the abovementioned embodiment may be any technique such as adhesion and fusing in addition to sewing.

The vehicle side airbag apparatus described above is the preferred example of the invention, with embodiments other than those described also capable of being implemented or executed via a variety of methods. In particular, unless otherwise described in the specification of the application, the invention is not restricted to the shapes, sizes, configurational dispositions, and the like of the parts illustrated in detail in the accompanying drawings. In addition, the expressions and terms used in the specification of the application are used for providing a description, without limiting the invention thereto, unless specifically described otherwise.

REFERENCE NUMERALS

1 Vehicle side airbag apparatus
3 Side airbag
4 Inflator
5 First baffle
6 Second baffle
6a Bend
6d Edge partitioning the crossover opening
6e Arc shaped part
7 Vehicle interior panel part
8 Vehicle exterior panel part
11 Cylindrical cover
11b, 11c Gas outlet
13 Tether
14 Baffle intersection
16 Crossover opening
17 Communication hole
18 Check valve
Q Ridge line
S2 Second sewing line (baffle joint)
Sb Baffle sewing line
X Lower chamber
Y Upper front chamber
Z Upper rear chamber
α Two surfaces
β Fold line
γ Baffle piece
δ Gap between baffles

The invention claimed is:

1. A side airbag apparatus for a vehicle comprising:
an inflator; and
a side airbag, the side airbag including:
a vehicle exterior panel part;
a vehicle interior panel part;
a first baffle joined to the vehicle exterior panel part and the vehicle interior panel part, the first baffle extending in an anteroposterior direction of the vehicle so as to section an inside of the side airbag into a lower chamber and an upper chamber, the first baffle including at first and second sides connected at a longitudinally extending ridge line, the first and second sides at least partially overlapping in a width direction;
a second baffle joined to the vehicle exterior panel art and the vehicle interior panel part, the second baffle extending in a vertical direction of the vehicle and sectioning the upper chamber into an upper front chamber and an upper rear chamber,
a baffle intersection between the first and second baffles partially at a redetermined position of the ridge line of the first baffle; and
a crossover opening defined by the first baffle through which the second baffle extends,
when the crossover opening has a gap formed between a crossing of the first and second baffles, and
wherein the inflator is disposed in at least the upper rear chamber and inflation gas from the inflator flow from the upper rear chamber towards the upper front chamber through the gap of the crossover opening.

2. The vehicle side airbag apparatus according to claim 1, wherein the second baffle has a baffle joint at the baffle intersection which is joined to the first baffle at a position so as to avoid the ridge line of the first baffle.

3. The vehicle side airbag apparatus according to claim 1, wherein the ridge line of the first baffle is set at a predetermined location in a thickness direction of the side airbag.

4. The vehicle side airbag apparatus according to claim 1, wherein the ridge line is a fold line which forms the two surfaces facing each other by folding back the first baffle.

5. The vehicle side airbag apparatus according to claim 1, wherein the ridge line is formed by a sewing line which joins baffle pieces configuring the two surfaces so as to face each other in order to form the first baffle.

6. The vehicle side airbag apparatus according to claim 1, wherein the second baffle having the crossover opening has an edge forming the crossover opening, and the edge comprises an arc shaped part formed into an arc shape winding around from one of the two surfaces to the other thereof near the ridge line of the first baffle.

7. The vehicle side airbag apparatus according to claim 1, wherein the side airbag further includes a cylindrical cover surrounding an entirety of the inflator and comprising a gas outlet at an upper end part and a lower end part in order to supply the inflator gas to both the upper rear chamber and the lower chamber, wherein the vicinity of the gas outlet at the lower end part of the cylindrical cover comprises a check valve for regulating the backflow of the inflator gas supplied to the lower chamber.

8. The vehicle side airbag apparatus according to claim 1, wherein, at an intermediate part in the longitudinal direction of the second baffle, the second baffle includes a bend which is bent so as to protrude from the upper front chamber side to the upper rear chamber side.

9. The vehicle side airbag apparatus according to claim 1, wherein a tether, which is joined to the vehicle exterior panel part and the vehicle interior panel part and regulates the thickness of the side airbag when the side airbag is deployed and expanded, is provided in the upper rear chamber.

10. The vehicle side airbag apparatus according to claim 1, wherein a communication hole, which allows the upper rear chamber to communicate with the upper front chamber so as supply the inflator gas, is formed at the second baffle.

11. The vehicle side airbag apparatus according to claim 10, wherein the communication hole is formed at a predetermined position of the ridge line.

12. The vehicle side airbag apparatus according to claim 10, wherein the communication hole is formed at a position so as to avoid the ridge line.

13. A side airbag for a vehicle comprising:
a vehicle exterior panel part;
a vehicle interior panel part;
a first baffle joined to the vehicle exterior panel part and the vehicle interior panel part, the first baffle extending in an anteroposterior direction of the vehicle so as to section an inside of the side airbag into a lower chamber and an upper chamber, the first baffle including at first and second sides connected at a longitudinally extending ridge line, the first and second sides at least partially overlapping in a width direction;
a second baffle joined to the vehicle exterior panel part and the vehicle interior panel part, the second baffle extending in a vertical direction of the vehicle and sectioning the upper chamber into an upper front chamber and an upper rear chamber, a baffle intersection between the first and second baffles partially at a predetermined position of the ridge line of the first baffle; and a crossover opening defined by the first baffle through which the second baffle extends, wherein the crossover opening has a gap formed between a crossing of the first and second baffles, and wherein a channel for inflation gases extends flow from the upper rear chamber towards the upper front chamber through the gap of the crossover opening.

* * * * *